United States Patent [19]

Motozawa

[11] Patent Number: 4,925,212
[45] Date of Patent: May 15, 1990

[54] SEAT BELT TIGHTENING SYSTEM ADAPTED TO BE MOUNTED ON AN ADJUSTABLE SEAT

[75] Inventor: Yasuki Motozawa, Saitama, Japan

[73] Assignee: Honda Giken Kogyo Kabushiki Kaisha, Tokyo, Japan

[21] Appl. No.: 335,416

[22] Filed: Apr. 10, 1989

[30] Foreign Application Priority Data

Apr. 19, 1988 [JP] Japan .............................. 63-52709[U]

[51] Int. Cl.⁵ .............................................. B60R 22/40
[52] U.S. Cl. .................................... 280/807; 297/480
[58] Field of Search ............... 280/801, 802, 804, 806, 280/807, 808; 297/480, 473

[56] References Cited

U.S. PATENT DOCUMENTS

| | | | |
|---|---|---|---|
| 3,833,239 | 9/1974 | coenen | 280/804 |
| 4,317,584 | 3/1982 | Takata | 280/804 |
| 4,730,844 | 3/1988 | Patterson | 280/804 |
| 4,840,325 | 6/1989 | Higuchi et al. | 280/806 |
| 4,864,086 | 9/1989 | Akiyama et al. | 200/61.53 |

FOREIGN PATENT DOCUMENTS

| | | | |
|---|---|---|---|
| 3238195 | 4/1984 | Fed. Rep. of Germany | 280/802 |
| 3312480 | 10/1984 | Fed. Rep. of Germany | 297/473 |

*Primary Examiner*—Charles A. Marmor
*Assistant Examiner*—Tamara L. Finlay
*Attorney, Agent, or Firm*—Armstrong, Nikaido, Marmelstein, Kubovcik & Murray

[57] ABSTRACT

A seat belt tightening system adapted to be used in conjunction with a vehicle seat whose position can be adjusted, comprising: a deceleration sensor mounted on a vehicle body; a drive unit mounted on the vehicle body for producing drive power in response to detection of acceleration exceeding the threshold level by the deceleration sensor; a seat belt tightening unit mounted on the vehicle seat for applying tension to a seat belt with the drive power supplied from the drive unit; and drive power transmitting mechanisms for transmitting the drive power from the drive unit to the seat belt tightening unit, the drive power transmitting means being provided with coupling means for not interfering with adjustment movement of the seat. Since the seat belt tightening unit is mounted on the seat and the deceleration sensor is mounted on the vehicle body, an optimum position of the seat belt can be ensured irrespective of the adjustable position of the seat and the deceleration sensor is free from erroneous activation due to deceleration arising from the movement of the seat. Since the drive unit and the deceleration sensor may be formed as a single sub assembly, a fast response can be obtained, and the assembly work is simplified.

6 Claims, 2 Drawing Sheets

SEAT BELT TIGHTENING SYSTEM ADAPTED TO BE MOUNTED ON AN ADJUSTABLE SEAT

TECHNICAL FIELD

The present invention relates to a seat belt tightening system for removing slack from a seat belt upon occurrence of a vehicle crash to ensure the effectiveness of the seat belt, and in particular to such a seat belt tightening system which is adapted to be mounted on an adjustable seat so that the seat belt may be worn closely across the body of the seat belt wearer irrespective of the adjusted position of the seat.

BACKGROUND OF THE INVENTION

Seat belts are particularly effective when they are worn by the vehicle occupants closely upon their bodies and slack in the seat belts is minimized. However, as this will cause considerable discomfort to the wearers, retractor devices are widely used with seat belts so as to accommodate the movement of the seat belt wearers by using spring loaded winding spools.

As such a retractor device, the emergency lock retractor device has recently come to be widely used so that the movement of the occupant may not be restrained under normal condition but the winding spool may be locked up instantaneously upon detection of deceleration or rapid pay-out of the seat belt resulting from occurrence of a vehicle crash or a sudden braking to ensure an appropriate level of the tension of the seat belt.

However, such a retractor device merely prevents any further pay out of the seat belt once the winding spool is locked up. If the seat belt is positively retracted to the extent required to remove slack from the seat belt upon detection of a vehicle crash, the occupant will be improved even further.

Based upon such a recognition, various preloader devices have been proposed, such as those disclosed in U.S. Pat. Nos. 4,840,325 and 4,864,086 which improve the capability of the seat belt system to restrain a vehicle occupant by clamping a part of the seat belt paid out from the retractor device and pulling the clamped part towards the retractor device in response to a signal from a deceleration sensor for detecting deceleration greater than a certain level acting upon the vehicle. The disclosure of these patents are incorporated herein by reference.

A vehicle seat is normally mounted on a pair of slide rails extending along the longitudinal direction for permitting the positional adjustment of the seat. Therefore, in order for the seat belt to be in the optimum position irrespective of the adjusted position of the seat, a preloader device is desired to be mounted on the vehicle seat. However, in adjusting the position of the seat or, in case of a walk-in seat, in moving the front seat out of the way for getting into the rear seat, the seat may be moved or stopped abruptly. In particular, when the movement of the seat is abruptly stopped by the engagement of a seat lock mechanism for securing the seat at its adjusted position, an impulsive deceleration acts upon the seat. Therefore, if a preloader device is mounted on such a seat, the deceleration sensor of the preloader device may be erroneously activated. If a deceleration sensor is mounted on the vehicle body separate from the main body of the preloader device to avoid this problem, the assembly work becomes unfavorably complex.

BRIEF SUMMARY OF THE INVENTION

In view of such problems of the prior art, a primary object of the present invention is to provide a preloader system or a seat belt tightening system which may be mounted on a vehicle seat without risking the possibility of erroneous activation.

A second object of the present invention is to provide a seat belt tightening system having a utilized structure which may be readily mounted on a vehicle seat.

A third object of the present invention is to provide a seat belt tightening system which can keep the seat belt at its optimum state even when the position of the seat is adjusted.

These and other objects of the present invention can be accomplished by providing a seat belt tightening system adapted to be used in conjunction with a vehicle seat whose position can be adjusted, comprising: a deceleration sensor mounted on a vehicle body for detecting deceleration exceeding a threshold level indicative of a vehicle crash; a drive unit mounted on the vehicle body for producing drive power in response to detection of acceleration exceeding the threshold level by the deceleration sensor; a seat belt tightening unit mounted on the vehicle seat for applying tension to a seat belt with the drive power supplied from the drive unit; and drive power transmitting means for transmitting the drive power from the drive unit to the seat belt tightening unit, the drive power transmitting means being provided with coupling means for transmitting the drive power from the drive unit to the seat belt tightening unit without interfering with movement of the seat.

Since the seat belt tightening unit is mounted on the seat and the deceleration sensor is mounted on the vehicle body, an optimum position of the seat belt can be ensured irrespective of the adjustable position of the seat and the deceleration sensor is free from erroneous activation due to deceleration arising from the movement of the seat. Preferably, the drive unit and the deceleration sensor are formed as a single sub assembly so that a fast response may be obtained, and the assembly work may be simplified.

According to a preferred embodiment of the present invention, the drive power consists of rotary drive power, and the drive power transmitting means comprises a rotary rod, having a non-circular cross section and extending in a direction of possible movement of the seat, which is slidably fitted into an opening provided in a power input end of the seat belt tightening unit to receive the rotary rod so that the rotary unit may be freely slidable along its axial direction but to rotate in unison with respect to the power input end of the seat belt tightening unit.

The actuating part for applying tension to the seat belt may consist of a pair of clamp members such as those disclosed in the aforementioned patents. Alternatively, such an actuating part may consist of a winding spool which normally functions as a part of a spring loaded retractor. In such a case, it is preferred that the drive power consists of rotary drive power, and the drive power transmission means comprises a centrifugal clutch which becomes engaged only when the rotational speed of output of the drive unit is higher than a certain level. Thereby, the drive unit would not interfere with the normal function of the winding spool of the retractor.

In case of passive seat belt systems in which one of the ends of the seat belt is moved between a position adjacent to a front pillar for not obstructing the boarding and unboarding of the vehicle occupant and another position adjacent to a center pillar for positively restraining the vehicle occupant according to the opening and closing movement of the door, it is preferred that the seat belt retractor unit is mounted on an inner side of one of a pair of laterally arranged seats, and the drive unit is mounted on a floor tunnel extending between the seats.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
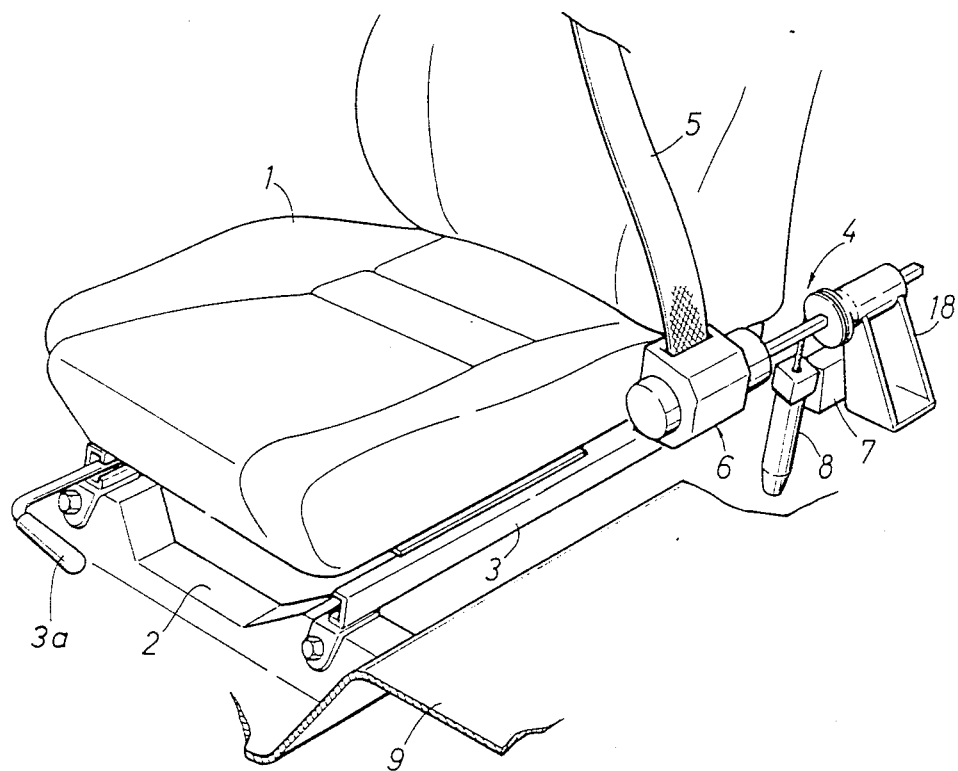
FIG. 1 is a fragmentary perspective view of an adjustable vehicle seat to which the seat belt tightening system of the present invention is applied.

FIG. 1 shows a front seat 1 of a vehicle to which an embodiment of the present invention is applied. The seat 1 is slidably supported by a pair of slide rails 3 which are in turn fixedly secured on a vehicle floor member 2, and the longitudinal position to the seat 1 can be adjusted by engaging and disengaging a seat slide lock mechanism not shown in the drawings by actuating a lever 3a. A seat belt preloader device 4 is fixedly mounted on a lower side portion of the seat 1, and the seat belt 5 extending from this preloader device 4 is passed through a shoulder anchor not shown in the drawings, and its free end is attached to a center pillar or the like. The seat belt 5 may also be a part of a passive seat belt system in which the free end of the seat belt is moved between a position adjacent to a front pillar for not obstructing the boarding and unboarding of the vehicle occupant and another position adjacent to a center pillar for positively restraining the vehicle occupant according to the opening and closing movement of the door.

The preloader device 4 comprises a retractor unit 6, a deceleration sensor 7 for detecting deceleration of the vehicle exceeding a certain threshold level, and a drive unit 8 for supplying driving power to the retractor unit 6. The retractor unit 6 is fixedly secured to a side of the seat 1 while the deceleration sensor 7 and the drive unit 8 are mounted on top a floor tunnel 9 as a sub assembly.

The retractor unit 6 consists of an emergency lock retractor device of a known type which can freely pay out and retract the seat belt 5 so as to accommodate the movement of the vehicle occupant under normal condition but locks up its spring loaded winding spool 22 (FIG. 2) upon detection of a sudden braking or other high deceleration situations so as to prohibit of the pay out of the seat belt 5.

Figure 2:
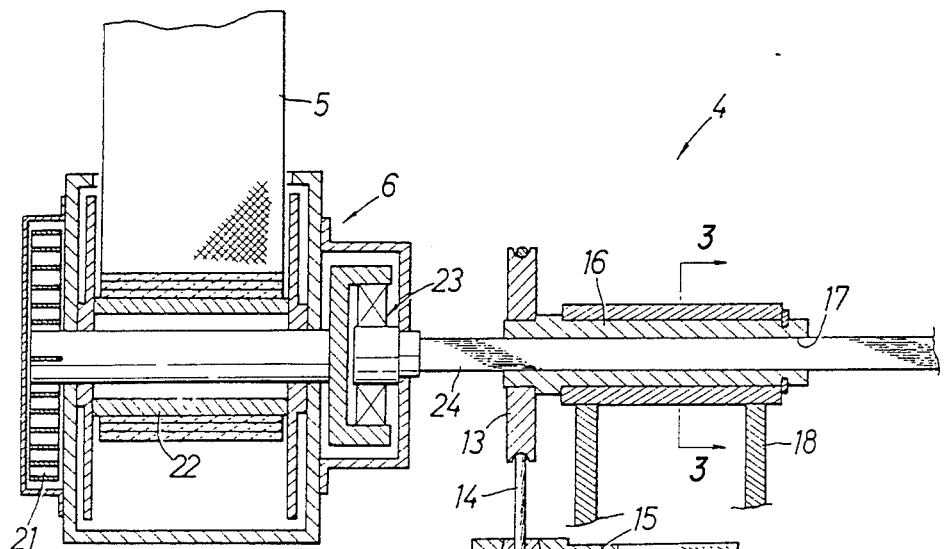
FIG. 2 is a schematic sectional view of an embodiment of the seat belt tightening system according to the present invention.

Referring to FIG. 2, the drive unit 8 is provided with a cylinder 12 slidably receiving a piston 11 therein, a pulley 13 rotatably supported by the casing of the retractor unit 6 by way of a pivot shaft 16, a wire 14 having one end attached to the piston 11 and an appropriate part of the pulley 13, and a propellant 15 received in the base end of the cylinder 12. When the deceleration sensor 7 has detected deceleration exceeding a certain threshold level, a firing pin not shown in the drawings is struck upon the propellant 15 causing combustion thereof. The resulting explosive volumetric expansion of the propellant 15 causes a linear movement of the piston 11, and it is converted into a rotary movement by the wire 14 and the pulley 13.

Figure 3:
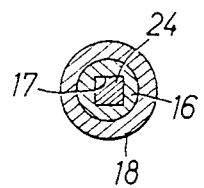
FIG. 3 is a sectional view taken along line III—III of FIG. 2.

The retractor unit 6 is provided with a winding spool 22 which is urged by a spiral spring 21 so as to wind the seat belt 5 thereon, and a torque transmission rod 24 which is connected to the winding spool 22 via a centrifugal clutch 23. The torque transmission rod 24 is provided with a length corresponding to the adjustable range of the seat 1, and a substantially rectangular cross section as shown in FIG. 3.

The centrifugal clutch 23 can transmit torque from the torque transmission rod 24 to the winding spool 22 only when the rotational speed of the torque transmission rod 24 is higher than a certain value, and as long as the torque transmission rod 24 is not rotating at sufficiently high speed the movement of the winding spool 22 is in no way obstructed by the torque transmission rod 24 or the drive unit 8 as it winds the seat belt 5 thereon or unwinds the seat belt 5 therefrom.

The axial center of the pivot shaft 16 of the pulley 13 is provided with a rectangular bore 17 which receives the torque transmission rod 24 therein in axially slidable manner. The pivot shaft 16 is received by a bearing bracket 18 fixedly secured to the floor tunnel 9.

Now the operation of the above described embodiment is described in the following.

When a deceleration level indicative of a vehicle crash is detected by the deceleration sensor 7, it activates a firing pin to ignite the propellant 15. The resulting volumetric expansion of the propellant 15 linearly drives the piston 11 in the cylinder 12, and drivingly rotates the pulley 13 along with the torque transmission rod 24 by way of the wire 14. The rotation of the torque transmission rod 24 engages the centrifugal clutch 22 whereby the winding spool 22 is rotated and the seat belt 5 is wound thereon. Upon completion of the seat belt winding movement, the winding spool 22 is securely engaged by a ratchet mechanism of a known type so as to prevent the reverse rotation of the winding spool 22 and maintain the tension of the seat belt 5.

For optimum protection of the vehicle occupant upon occurrence of a vehicle crash, the seat belt 5 is desired to be passed as closely to the body of the vehicle occupant as possible. Additionally, the deceleration sensor 7 is desired to be mounted on the vehicle body, instead of the seat 1, so as to be activated only by a vehicle crash and not by the movement of the seat 1 for adjustment or other purpose. Further, the deceleration sensor 7 and the drive unit 8 are desired to be consolidated into a single unit for simplifying the structure and obtaining a fast response.

To meet these requirements, in the seat belt tightening system of the present embodiment, the retractor unit 6 having the winding spool 22 for winding the seat belt 5 thereon is mounted on the seat 1 while the sub assembly consisting of the deceleration sensor 7 and the drive unit 8 is mounted on a floor tunnel 9, these two parts being coupled by a extendable coupling, so that the retractor unit 6 may be moveable relative to the sub assembly as the position of the seat is adjusted. Since the drive unit and the deceleration sensor are thus formed as a single sub assembly, a fast response can be obtained, and the assembly work is simplified.

Although the present invention has been described in terms of a specific embodiment, it is obvious to a person skilled in the art that various modifications are possible without departing from the spirit of the present invention. For instance, the means for transmitting torque from the drive unit 8 to the retractor unit 6 may also be a flexible cable or other means for transmitting drive power which permits relative movement between the drive unit 8 and the retractor unit 5 resulting from movement of the seat.

What we claim is;

1. A seat belt tightening system adapted to be used in conjunction with a vehicle seat whose position can be adjusted, comprising:

a deceleration sensor mounted on a vehicle body for detecting deceleration exceeding a threshold level indicative of a vehicle crash;

a drive unit mounted on said vehicle body for producing drive power in response to detection of deceleration exceeding said threshold level by said deceleration sensor;

a seat belt tightening unit mounted on said vehicle seat for applying tension to a seat belt with said drive power supplied from said drive unit; and drive power transmitting means for transmitting said drive power from said drive unit to said seat belt tightening unit, said drive power transmitting means being provided with coupling means for transmitting said drive power from said drive unit to said seat belt tightening unit without interfering with adjustment movement of said seat.

2. A seat belt tightening system according to claim 1, wherein said deceleration sensor and said drive unit are formed as a single sub assembly.

3. A seat belt tightening system according to claim 1, wherein said drive power consists of rotary drive power, and said drive power transmitting means comprises a rotary rod, having a non-circular cross section and extending in a direction of possible adjustment movement of said seat, which is slidably fitted into an opening provided in a power output end of said drive unit to receive said rotary rod so that said rotary had may be freely slidable along its axial direction able but to rotate in unison with respect to said power output end of said drive unit.

4. A seat belt tightening system according to claim 1, wherein said drive power consists of rotary drive power, and said drive power transmission means comprises a centrifugal clutch which becomes engaged only when the rotational speed of output of said drive unit is higher than a certain level.

5. A seat belt tightening system according to claim 1, wherein said seat belt retractor unit is mounted on an inner side of one of a pair of laterally arranged seats, and said drive unit is mounted on a floor tunnel extending between said seats.

6. A seat belt tightening system according to claim 1, wherein said drive power consists of rotary drive power, and said seat belt tightening unit consists of a retractor unit having a winding pulley which is adapted to be rotated in case of a vehicle crash, said drive power transmission means comprising a centrifugal clutch which becomes engaged only when the rotational speed of output of said drive unit is higher than a certain level.

* * * * *